Jan. 4, 1966 H. C. GOHS 3,227,803
FITTING FOR FLEXIBLE CONDUIT
Filed March 25, 1964 3 Sheets-Sheet 1
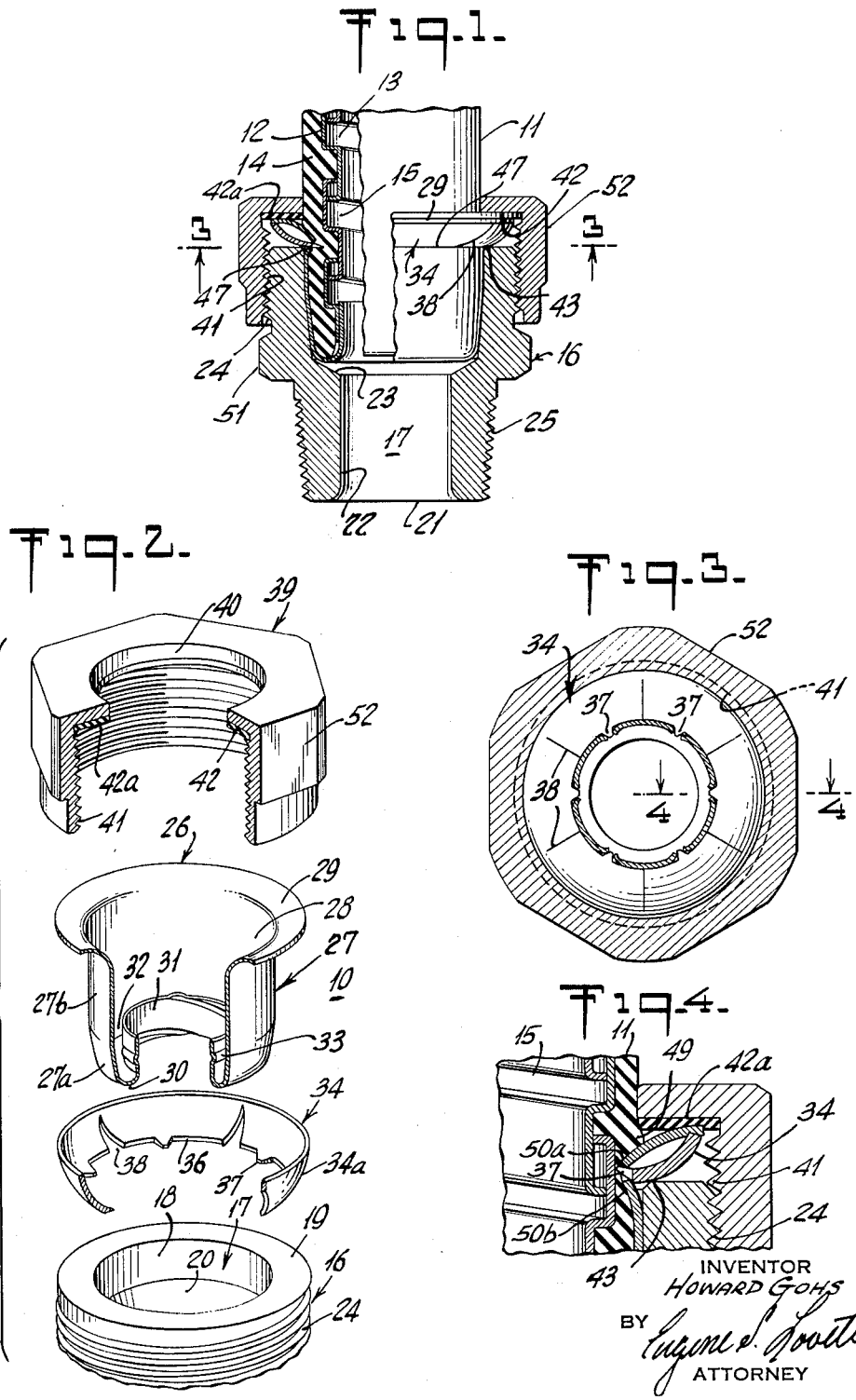
INVENTOR
HOWARD GOHS
BY
ATTORNEY

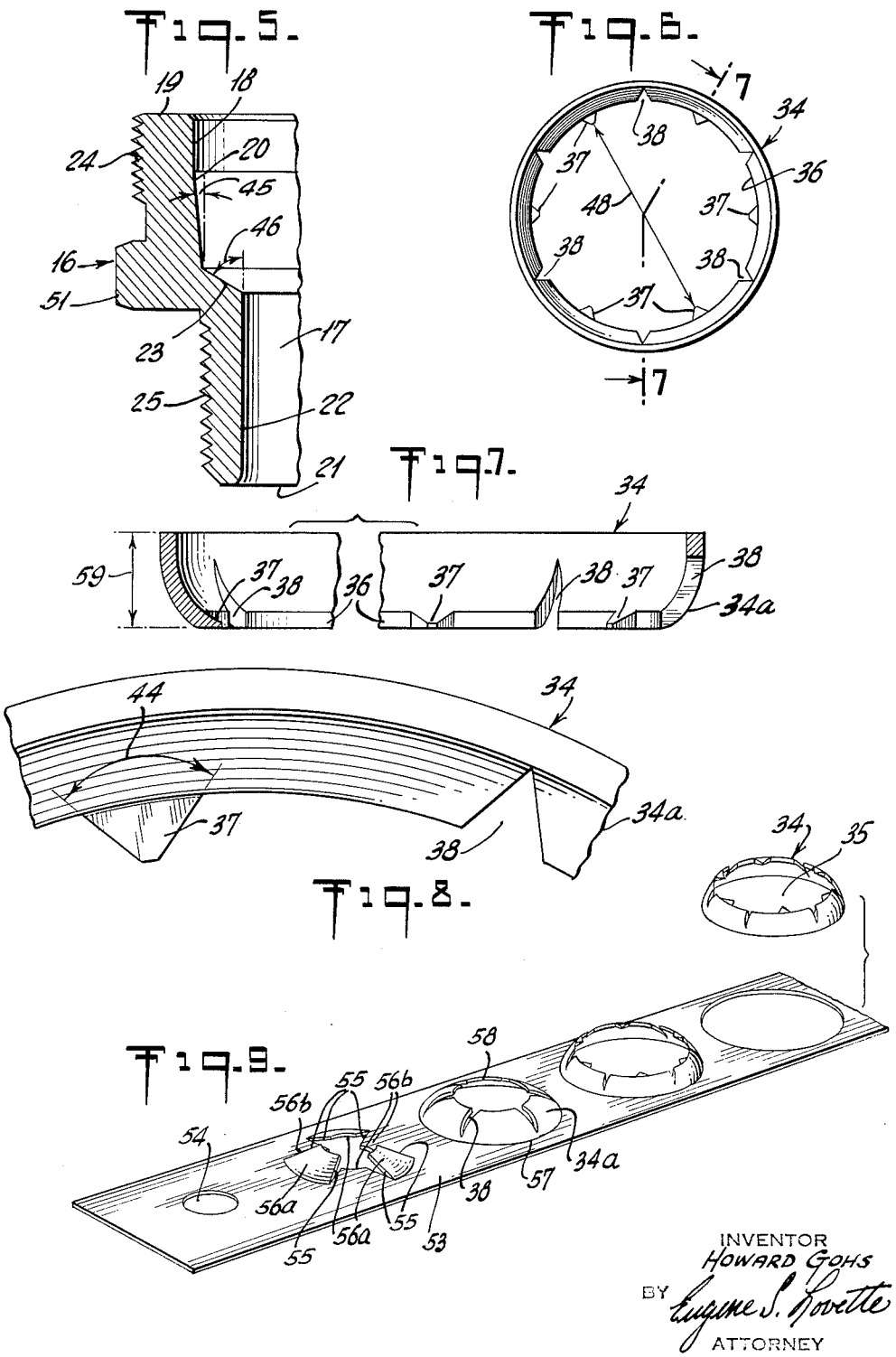

Jan. 4, 1966 H. C. GOHS 3,227,803
FITTING FOR FLEXIBLE CONDUIT
Filed March 25, 1964 3 Sheets-Sheet 3

INVENTOR.
HOWARD C. GOHS
BY
ATTORNEY

United States Patent Office 3,227,803
Patented Jan. 4, 1966

3,227,803
FITTING FOR FLEXIBLE CONDUIT
Howard C. Gohs, Syosset, N.Y., assignor to Electrical Fittings Corporation, East Farmingdale, N.Y., a corporation of New York
Filed Mar. 25, 1964, Ser. No. 356,001
11 Claims. (Cl. 174—78)

This application is a continuation-in-part of my copending application Serial No. 112,945, entitled Liquid Tight Connector for Flexible Electrical Conduit and filed May 26, 1961, now abandoned.

This invention relates to an improved liquid tight electrical conduit connector for connection to a flexible conduit, which conduit is characterized by a convolute metallic axial core surrounded by a co-extending insulator sheath.

It is the principal object of the invention to provide a structurally and electrically reliable liquid tight connector for terminating a liquid tight flexible electrical conduit, wherein said conduit is characterized by a convolute metallic axial core surrounded by an insulator sheath, and further wherein said connector is economical in fabrication and use and also characterized by reliability and ease of assembly and attachment to the conduit.

It is a further object of the invention to provide an improved liquid tight connector for flexible electrical conduit, wherein said connector is designed to safeguard against accidental disassembly of the connector or accidental detachment of the conduit once the latter is attached to the connector, and which connector also provides a positive ground continuity to the conduit core.

It is a further object of the invention to provide a liquid tight connector for connection to the cut-off end of a flexible tubular electrical conduit, wherein tubular fitting means is seated in a connector body to provide a liquid tight seal at that portion of the connector; the connector also includes a grounding and clamping ring seated on the tubular means exteriorly of the connector body and which ring is acted upon by the exterior end of the tubular means and a clamping nut for clamping the ring against the connector body, whereby the ring pierces the tubular means to enter the conduit for gripping same and grounding the conduit core.

Further objects and advantages will become apparent from the description of the invention taken in conjunction with the figures, in which:

FIG. 1 is a longitudinal elevation partly cut away and partly in section, illustrating a flexible conduit attached to an assembled connector in accordance with the principles of the invention;

FIG. 2 is an exploded longitudinal view of the component connector parts in perspective and partly cut away;

FIG. 3 is a plan sectional view taken along line 3—3 of FIG. 1;

FIG. 4 is a fragmentary view partly in section taken along line 4—4 of FIG. 3;

FIG. 5 is a longitudinal elevation cut away and in section of the connector body;

FIG. 6 is a plan view of the gland ring;

FIG. 7 is a cut away view in section along lines 7—7 of FIG. 6;

FIG. 8 is a fragmentary enlargement of the gland ring;

FIG. 9 is a perspective view of a punched ribbon of metal showing successive steps for forming the gland ring;

Figure 10:
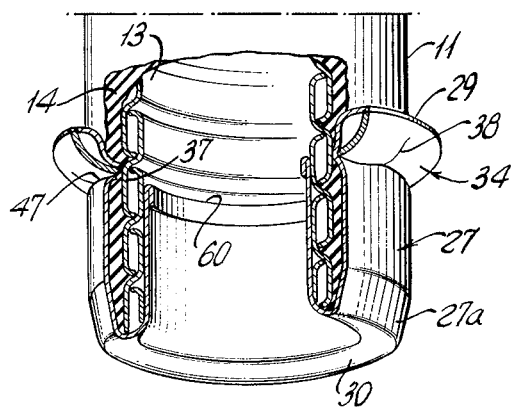
FIG. 10 is an elevational view partly cut away to illustrate a section of the connector employing a modified embodiment of tubular fitting means.

Reference is made to the figures, which illustrate a connector 10 in accordanec with the invention. Connector 10 is designed to provide a liquid tight termination connection to a conventional flexible tubular conduit 11. As known in the art, conduit 11 has a spiral convolute metallic axial core 12, wherein the windings thereof form a convolute interior thread 13. Core 12 is covered by a flexible sheath 14 of suitable insulator material, such as rubber, whereby conduit 11 is liquid tight. The electrical wires (not shown) protected by conduit 11 are snaked or pulled through the hollow interior 15 of core 12. Since conduit 11 is liquid tight, it is desirable for connector 10 to maintain such liquid tight characteristics.

Connector 10 includes a tubular connector body 16 of conductive material, such as steel, malleable iron or die cast alloys. Connector body 16 has an internal through bore 17 extending axially between its front and back ends. Bore 17 includes a first section 18 of cylindrical diameter adjacent the body back end 19 and a tapered second section 20 axially adjacent first section 18. The taper of section 20 provides a decreasing diameter in the axial direction from section 18 towards the front end 21 of connector body 16. In the illustrated embodiment, the bore surface of section 20 tapers approximately 5° with respect to the connector axis. This angle is depicted as reference 45 in FIG. 5. Bore 17 at its front end includes a fourth section 22 of cylindrical diameter smaller than the adjacent end of tapered section 20. Bore sections 20 and 22 are joined by an axially short section having a sharp tapered surface measuring about 70° with respect to the connector axis to define a substantially radial annular internal shoulder 23 at the forward end of section 20. This angle is depicted by reference 46 in FIG. 5. The outer surface of body 16 has a threaded portion 24 adjacent its back end 19 and a threaded portion 25 along its front end. The front end of connector body 16, including bore section 22 and outer threaded section 25, serve as a conventional fitting for attaching connector 10 to a fixture, outlet box, panel board or the like. The front end fitting means shown herein are merely illustrative.

Connector 10 also includes a thin wall liquid tight ferrule or fitting 26 of relatively soft conductive material, such as brass. Fitting is essentially a hollow brass tubular side wall 27 having an axial through passage 28. Side wall 27 is provided with an outwardly flared flange 29 at its back end and a converted portion at its front end 30. The converted portion is defined by forming side wall 27 with a smooth surfaced turned back section 31, which section is also tubular in shape. Section 31 is spaced from and co-extending axially a suitable length within outer side wall 27 to define an annular recess 32 into which the cut-off end of conduit 11 is seated upon inserting same into fitting passage 28.

At the front end of fitting 26, its side wall 27 is provided with an outer diameter tapered section 27a and an axial adjacent cylindrical diameter section 27b. The O.D. of section 27a tapers approximately 5° with respect to the longitudinal connector axis with the small diameter end at 30. The axial length of section 27a is less than the axial length of bore section 20. The axial length of section 27b is preferably longer than bore section 18. In the illustrated embodiment, the axial length of section 27a is .250 inch and the axial length of section 20 is .276 inch; the axial length of section 27b is approximately ¼ inch and the axial length of bore section 18 is approximately 5/32 inch. The O.D. of sections 27a, 27b are slightly less than the I.D. of corresponding bore sections 20, 18 respectively, to provide a continuous contact fit between fitting 26 and body 16 upon axial insertion of the former into bore sections 18, 20 of the latter. In particular, these mating portions are designed so that the O.D. surface of fitting section 27a is in a wedge-like contact against the I.D. surface of bore section 20 upon axial insertion of fitting 26 into connector body 16, however, fitting front end 30 does not bottom against bore shoulder 23. In the illustrated embodiment, the I.D. of section 18 is .885 inch and the O.D. of section 27b is .880 inch. The resiliency of fitting 26 and the fact that its front end section 27a is tapered, allows easy axial seating of fitting 26 into body bore sections 18, 20. The depth of insertion is controlled by fitting sections 27a entering into a wedge-like contact with the I.D. surface of bore section 20; at no time, however, does fitting front end 30 bottom against shoulder 23. The wedge-like annular contact between the surfaces of tapered section 27a against tapered bore section 20 provides a liquid tight seal at this portion of connector 10 upon clamping tight connector 10 to conduit 11. In addition, during clamp tightening operation, the foregoing described mating parts also act to prevent turning of conduit 11 about its longitudinal axis when the conduit is seated in fitting recess 32. Fitting front end 30 is rounded where it joins with wall sections 27a and 31 for convenience of manufacture of fitting 26 and assembly of connector 10.

As an alternative embodiment, turned back portion 31 may include one complete spiral thread 33 designed to register with spiral convolute 13 along the interior of conduit core 12 upon seating the cut-off conduit end into annular recess 32, see FIG. 2. However, spiral 33, which is required in prior art connectors, is not necessary here because of the improved grounding and gripping characteristics provided by the illustrated connector. The radial width and axial length of recess 32 is designed to receive, seat and shield a conduit of conventional design and thickness without difficulty. As seen from FIG. 1 of the assembled connector 10, the axial length of fitting 26 is designed so that its back end flange 29 projects axially beyond connector body back end 19 when fitting 26 is seated in body bore 17.

A gland or clamping ring 34 of relatively hard conductive material, such as cold rolled steel, is provided with a central opening 35 for mounting ring 34 over fitting 26 between connector body back end 19 and fitting flange 29. In assembly of connector 10, ring 34 is mounted on fitting 26 and the latter is then inserted into body bore 17. Clamp ring 34 is a relatively short axial member and is generally dish-shaped including a bowed-shaped wall 34a in cross-section to present a substantially convex surface to the back end 19 of connector body 16 and a concave surface facing flange 29. The front face of ring member 34 is essentially a substantially peripheral edge 36 around central opening 35, that is to say, peripheral edge 36 lies in a plane substantially normal with respect to the longitudinal axis of connector 10. Peripheral edge 36 includes a plurality of circumferentially spaced piercing elements 37, which elements are no more than radially extending triangular projections 37. Open ended triangular-shaped slots 38 are cut radially into peripheral edge 36 preferably with one slot 38 between each pair of adjacent piercing elements 37. The outer diameter of ring member 34 is of suitable size to prevent entry of same into body bore 17 and also to permit the back edge of ring 34 to engage fitting flange 29 so that the latter can actually clamp ring member 34 hard against the confronting back end 19 of connector body 16 upon clamping conduit 11 tight to connector 10.

The clamping action is brought about by a nut 39 provided with a central opening 40 for mounting same over conduit 11 prior to seating the cut-off end of conduit 11 into fitting recess 32. Nut 39 has an internal thread 41 for advancing same along conductor body thread 24. Nut 39 also has an annular radial interior wall 42 for engaging the back face of fitting flange 29. As an alternative embodiment, wall 42 may be provided with a neoprene washer 42a. However, it has been found that the metal-to-metal contact between flange 29 and wall 42 is equally effective in providing a liquid tight seal thereat as the neoprene-to-metal contact of flange 29 against washer 42a. Nut 39 may be made of steel, malleable iron or die cast alloys. Nut 39 is threaded on connector body 16 to accomplish clamping, whereby nut wall 42 engages fitting flange 29 to drive fitting 26 axially into body bore 17 such that the O.D. of fitting section 27a wedges hard against the I.D. surface of bore section 20. In addition, this action causes flange 29 to carry ring 34 axially forward along fitting 26 until ring 34 is clamped hard between connector back end 19 and the combination of flange 29 and nut 39. It will be understood that the last-mentioned elements, that is to say, body back end 19 and the combination of flange 29 and nut 39, serve as the clamping means.

As seen from FIGS. 1 and 4, an annular line contact is developed between ring 34 and the confronting back end 19 of connector body 16. This line contact is depicted as 43 in FIGS. 1 and 4. The annular line contact 43 sets up a uniform clamping force against ring 34, whereby ring 34 reacts by collapsing or contracting, which action is taken up by squeezing of ring slots 38. Ring slots 38 close when ring 34 collapses as depicted in FIG. 3. In addition, the annular line contact 43 or pressure against ring 34 guides the individual ring piercing elements 37 to contact or converge along respective radial lines because of ring collapse. This action causes ring elements 37 to pierce through the relatively soft fitting side wall 27 and enter into conduit 11, whereby elements 37 tighten and bite positively against conduit core 12 to provide a positive grip connection between conduit 11 and connector 10. This grip connection secures conduit 11 against pull-out or turning about its axis after the clamp connection is made. In addition, this biting grip also provides a positive electrical grounding of conduit core 12 to connector 10. To permit piercing elements 37 to withstand structurally the load of piercing through fitting 26 and into conduit 11, elements 37 are shaped with a relatively wide angle of about 75°. This angle is depicted by reference 44 in FIG. 8.

Tightening of nut 39 to effect the clamping action produces a pressure along the front end of fitting 26 to produce the liquid tight seal between the contacting surfaces of bore section 20 against fitting wall section 27a. In addition, the developed contact pressure is transmitted through conduit 11 to turned back portion 31 of fitting 26. In essence, conduit 11 is pinched between tubular walls 27, 31. This positive grip prevents turning of conduit 11 about its axis as nut 39 is being tightened and during use of connector 10. The end of conduit 11 is preferably cut-off square with respect to its axis in preparation of inserting same into fitting passage 28 for seating in fitting recess 32. Seating of conduit 11 in recess 32 prevents unraveling of conduit cut-off end. With ring 34 on fitting 26 and fitting 26 seated in connector body bore 17, nut 39 is mounted over the cut-off end of conduit 11, whereby conduit 11 may then be inserted into fitting passage 28. It will also be understood that connector 10 may be completely assembled with nut 39 threaded on body 16, but not tightened and wherein conduit 11 may be seated into connector 10 without disassembly of connector 10. After conduit 11 is seated, nut 39 is tightened. Moreover, after a conduit is clamped to a connector, connector 10 may be disassembled to permit withdrawal of the conduit, however, with fitting 26 attached thereto, whereby conduit 11 then may be reassembled to connector 10. This will permit complete assembly and operation of a machine employing a connector 10 and then disassembly of the machine and re-assembly elsewhere. After being clamped, the O.D. of conduit sheath 14 is in compressed contact with the I.D. of side wall 27, and the I.D. of conduit core is in contact with the O.D. of tubular section 31.

In addition to the liquid tight seal provided along bore section 20, it will also be understood that connector 10 also provides a liquid tight seal at the rear of the connector. Attention is now made to FIGS. 1 and 4, which depict the assembly after conduit clamping. Here it is seen that flange 29 is clamped circumferentially tight between the outer peripheral edge of ring 34 and nut wall 42 (with or without washer 42a) to provide an annular liquid tight seal at this portion of connector 10. When washer 42a is used it compresses, as illustrated in FIGS. 1 and 4, which contributes to the seal at this end of connector 10. Another annular seal is developed along the circumferential contact depicted as 47 in FIG. 1 between the peripheral ring edge 36 against fitting side wall 27. When ring 34 is collapsed, its edge 36 contracts around its entire circumference to squeeze in side wall 27 circumferentially. Although piercing elements 37 pass through wall 27 along the peripheral line contact 47, it has been found that the binding contact between bodies 26, 34 is liquid tight.

In the illustrated embodiment, ring diameter 48, FIG. 6, between diametrically opposite piercing points 37 measures .885 inch and is slightly larger than the diameter of wall 27b, the latter measures about .880 inch, whereas the diameter of ring opening 35 at edge 36 is about .11 inch greater than the O.D. of wall section 27b. The foregoing are the fabricated dimensions prior to clamping. In addition, a liquid tight seal also appears at the annular contact 43 between the surface of ring 34 and the confronting connector body end 19. These latter seals in cooperation with the foregoing described seal at the front end of fitting 26 safeguard the interior of connector 10 against liquid penetration. It will also be noted that the clamping action also causes conduit sheath 14 to bunch, whereby it becomes compressed and annularly enlarged on the inside of nut opening 40 as depicted at 49 in FIG. 4. Annular compression of sheath 14 also occurs between the I.D. of fitting wall 27 and conduit core 12 on both sides of the circumferential contact 47, wherein sheath 14 is squeezed between the adjacent metal bodies as depicted at 50a, 50b, which also contributes to the liquid tight sealing characteristics of connector 10. Body 16 and nut 39 have exterior hexagonal flats 51, 52 for a wrench grip.

In the illustrated embodiment, ring 34 is made by forming and punching same out of a sheet ribbon of cold rolled steel 53 as depicted in FIG. 9. The first step involves forming a pilot hole 54 in ribbon 53. Ribbon 53 is centered in a shearing die (not shown) by hole 54 to define six truncated flaps. Alternate ones of flaps 56a are raised above the level of the plane of ribbon 53. The other three flaps 56b remain level with the plane of ribbon 53. The length of cuts 55 will determine the size and shape of slots 38 in the next forming step. The sheared ribbon is then placed in a forming die (not shown) and formed to develop the bowl-shaped curved wall 34a. Wall 34a extends radially from the edge of hole 54 to a larger diameter annular bottom edge 57, which edge 57 lies radially beyond cuts 55. Upon forming wall 34a, cuts 55 take on the illustrated substantially triangular-shaped slots 38. The length and width proportions of slots 38 develop naturally from the sheared cuts 55. Piercing elements 37 are formed in the next step by a cutting die (not shown) which cuts back the peripheral top edge 58 of curved wall 34a adjacent hole 54, except at the points where the piercing elements 37 are desired. In the last step, ring 34 is cut from ribbon 53 by shearing same along edge 57 by a cutting die (not shown). In the illustrated embodiment, a .031 inch thick ribbon of cold rolled steel stock is formed with a one-half inch pilot hole 54. Six radial cuts, each 5/16 inch long, are formed about hole 54. The bowl-shaped wall 34a formed in step 3 is made approximately 3/16 inch high, that is to say, the axial length 59, FIG. 7, of ring 34 is about 3/16 inch.

Figure 11:
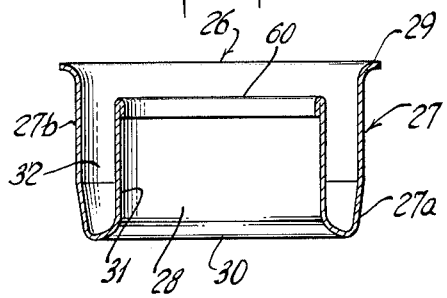
FIG. 11 is an elevational view in section, illustrating said modified tubular fitting means.

FIGS. 10 and 11 show a slightly modified embodiment for fitting 26. In this instance, the turned back converted fitting wall 31 extends axially almost back to flange 29. This provides a seat 32 almost the full axial length of fitting 26. It also will be noted, that the upper end of inner wall 31 is provided with a turned over edge 60. Edge 60 is formed by rolling wall 31 over, so as to provide a smooth edge to electrical wire as such wire is being snaked through the connector. A sharp edge at 60 is not desirable because it might cut the conduit wire insulation. In this embodiment, wall 31 is smooth, i.e. it does not include any thread such as 33. In all other respects, ferrule fitting 26 is substantially like the fitting described hereinbefore.

It is intended that all matter contained in the above description or shown in the accompanying drawings shall be interpreted as illustrative and not in a limiting sense.

What is claimed is:

1. A connector for connection with the cut-off end of tubular-like conduit having a pierceable outer sheath, the combination comprising, a connector body having an internal bore extending into said body from an end thereof, a conductive ferrule nesting in said body bore and having means for seating the cut-off end of said conduit upon insertion of said conduit into said body, a circumferentially collapsible gland ring mounted on said ferrule and having means for piercing through said ferrule and into said conduit sheath, and means on said body for circumferentially permanently collapsing and contracting said ring thereby causing annular contraction of said ring about said ferrule and also penetration of said piercing means through said ferrule and into said conduit for positive gripping of same.

2. A connector as defined in claim 1, wherein said collapsing and contracting means comprise, clamping means coacting with a portion of said connector body, said ring being located between said coacting clamping means and said connector body portion.

3. A connector as defined in claim 1, wherein said ferrule has a portion extending exteriorly of said connector body for coacting with a portion of said connector body, said ring being disk-shaped and located between said coacting ferrule and connector body portions with the convex surface of said ring facing said connector body portion, said collapsing and contracting means comprising the coacting portions of said ferrule and connector body.

4. A connector for connection with the free end of tubular-like conduit having a metallic axial core surrounded by a pierceable outer sheath, the combination comprising, a connector body having an internal bore extending into said body from an end thereof, a conductive ferrule nesting in said body bore and having means for seating the free end of the conduit upon insertion of said conduit into said body, a generally dish-shaped circumferentially collapsible conductive gland ring mounted on said ferrule, said ring being of harder material than said ferrule and having means for piercing through said ferrule and into said conduit sheath for making a grounding connection with said conduit core, and means coacting with said connector body for circumferentially collapsing and contracting said ring, thereby causing annular contraction of said ring about said ferrule and also penetration of said piercing means through said ferrule and into said conduit for conductively connecting said piercing means and conduit core, whereby a positive gripping and electrical grounding connection is effected between said connector and conduit.

5. A connector as defined in claim 4, wherein said coacting means further includes a connector body nut, said ring being located on said ferrule between said nut and the end of said connector body.

6. A connector for connection with the cut-off end of tubular-like conduit having a metallic axial core surrounded by a pierceable outer sheath, the combination comprising, a conductive connector body having an internal bore extending into said body from an end thereof, a conductive ferrule nesting in said body bore and having means for seating the cut-off end of said conduit upon insertion of said conduit into said body, a generally dish-shaped circumferentially collapsible conductive gland ring mounted on said ferrule and having piercing means for piercing through said ferrule and into said conduit sheath for making a grounding connection with said conduit core, said ferrule having an outwardly flared flange juxtaposed with respect to said end of said connector body, said ring mounted on said ferrule between said ferrule flange and said connector body end portions, and means coacting with said connector body for clamping said ring between said body end and ferrule flange portions for circumferentially collapsing and contracting said ring and thereby causing an annular contraction of said ring about said ferrule and also causing penetration of said ring piercing means through said ferrule and into said conduit, said ring piercing means conductively connecting with said conduit core upon said ring being clamped tight by said clamping means whereby a positive gripping and grounding connection is effected between said connector and conduit.

7. A connector as defined in claim 6, wherein said ferrule includes a tubular side wall having at its front end a turned back portion spaced from said side wall to provide said seating means within said connector body for receiving the cut-off end of said conduit, said ferrule tubular side wall being contiguous to the surface of said connector body bore, a section of said connector body bore being tapered to produce a wedging pressure against said ferrule to provide a tight seal between said connector body and said ferrule upon clamping said ring tight.

8. A connector as defined in claim 6, wherein said ring piercing means include a plurality of piercing elements and radial slots spaced in between said elements for allowing collapse of said ring upon clamping of same, said ring having its convex surface abutting said body and said piercing elements being substantially radial with respect to said ferrule.

9. A connector for connection with a cut-off end of a tubular-like conduit having a pierceable outer sheath comprising, a connector body having an internal bore extending into said body from an end thereof, a conductive ferrule nesting in said body bore and having a front end providing means for seating the cut-off end of said conduit upon insertion of said conduit into said body, said ferrule having a portion thereof extending exteriorly of said connector body, a circumferentially collapsible conductive gland ring mounted on said ferrule portion exterior of said body bore and having means for piercing through said ferrule and into said conduit sheath for making a grounding connection with said conduit core, said ring being concavo-convex shaped with its convex surface abutting said connector body end, and clamping means coacting with said connector body and engaging said ferrule and said ring for clamping same tight against said connector body end and thereby circumferentially collapsing and contracting said ring for causing an annular contraction of said ring about said ferrule and also causing penetration of said piercing means through said ferrule and into said conduit for gripping said conduit and for effecting a grounding connection with said conduit core.

10. A connector as defined in claim 9, wherein said ferrule has a tubular side wall contiguous to the surface of said connector body bore, a section of said bore being tapered to produce a wedging pressure contact against said ferrule, said ferrule being driven to advance axially into said body bore upon clamping of said ring, whereby a wedging presure contact is produced between said connector body and ferrule.

11. A fitting for attachment to the free end of a conduit having a yieldable outer sheath over a metal core comprising a tubular connector body, a deformable ferrule telescopically received within said body from one end of said body, said ferrule adapted to seat said conduit free end within said body, a generally dish-shaped gland ring mounted about said ferrule abutting said body, a plurality of circumferentially spaced radially inwardly extending piercing elements mounted on the inner peripheral edge of said ring, said ring having a plurality of spaced apart slots extending radially outwardly from the inner peripheral edge of said ring, said slots terminating adjacent the outer peripheral edge of said ring, and clamping means coacting with said connector body for urging said ring axially into engagement with said body, said ring being clamped by said body and said clamping means along the outer peripheral edge and along the convex surface of said ring, said slots being closed by action of said ring being clamped so that said ring contracts annularly about said ferrule forcing said ferrule into tight sealing engagement wth said conduit outer sheath and converging said piercing elements to pierce said ferrule and into said metal core of said conduit.

References Cited by the Examiner
UNITED STATES PATENTS

| | | | |
|---|---|---|---|
| 2,503,169 | 4/1950 | Phillips | 285—382 X |
| 2,782,060 | 2/1957 | Appleton | 285—256 X |
| 2,798,744 | 7/1957 | Budnick et al. | 285—257 X |
| 3,030,129 | 4/1962 | Appleton | 285—257 X |
| 3,030,130 | 4/1962 | Appleton | 285—257 X |

BERNARD A. GILHEANY, *Primary Examiner.*

E. JAMES SAX, JOHN F. BURNS, *Examiners.*

W. B. FREDRICKS, *Assistant Examiner.*